(12) United States Patent
Tamai et al.

(10) Patent No.: US 9,017,203 B2
(45) Date of Patent: Apr. 28, 2015

(54) COAXIAL GEAR SYSTEM

(71) Applicant: GM Global Technology Operations LLC, Detroit, MI (US)

(72) Inventors: Goro Tamai, West Bloomfield, MI (US); Shawn H. Swales, Canton, MI (US); Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 13/777,262

(22) Filed: Feb. 26, 2013

(65) Prior Publication Data

US 2014/0094334 A1    Apr. 3, 2014

Related U.S. Application Data

(60) Provisional application No. 61/708,872, filed on Oct. 2, 2012.

(51) Int. Cl.

| | |
|---|---|
| *F16H 3/72* | (2006.01) |
| *F16H 37/06* | (2006.01) |
| *B60K 6/365* | (2007.10) |
| *B60K 6/445* | (2007.10) |
| *F16H 37/08* | (2006.01) |
| *F16H 37/10* | (2006.01) |

(52) U.S. Cl.
CPC ............ *F16H 37/065* (2013.01); *Y10S 903/902* (2013.01); *B60K 6/365* (2013.01); *B60K 6/445* (2013.01); *F16H 2037/0866* (2013.01); *F16H 2200/2007* (2013.01); *Y02T 10/6239* (2013.01); *F16H 3/727* (2013.01); *F16H 2037/101* (2013.01); *F16H 37/0826* (2013.01)

(58) Field of Classification Search
CPC .................................. F16H 37/065; F16H 3/72
USPC ......... 475/5, 204, 330, 348, 151; 180/65.225, 180/65.23, 65.235, 65.24, 65.245, 65.25, 180/65.26; 384/461
See application file for complete search history.

(56) References Cited

U.S. PATENT DOCUMENTS

| | | | | |
|---|---|---|---|---|
| 4,280,376 | A * | 7/1981 | Rosen ........................... | 475/342 |
| 5,509,491 | A * | 4/1996 | Hall, III ....................... | 180/9.44 |
| 5,558,589 | A * | 9/1996 | Schmidt ............................ | 475/5 |
| 5,558,595 | A * | 9/1996 | Schmidt et al. ................... | 477/3 |
| 6,852,054 | B2 * | 2/2005 | Tumback et al. ................. | 475/5 |
| 7,086,977 | B2 * | 8/2006 | Supina et al. ..................... | 475/5 |
| 2012/0329594 | A1 * | 12/2012 | Sada et al. ......................... | 475/5 |
| 2013/0012347 | A1 * | 1/2013 | Ortmann et al. .................. | 475/5 |

* cited by examiner

*Primary Examiner* — Michael Mansen
*Assistant Examiner* — Tinh Dang
(74) *Attorney, Agent, or Firm* — Quinn Law Group, PLLC

(57) ABSTRACT

A gear-train for transferring torque from multiple power sources includes first, second, and third input members, and an output member. The first and second input members rotate about a first axis, the third input member rotates about a second axis, and the output member rotates about a third axis. The gear-train additionally includes a first gear-set connected to the first input member. The gear-train also includes a second gear-set connected to the second input member. The gear-train additionally includes an intermediate shaft that rotates about a fourth axis. Furthermore, the gear-train includes a third gear-set connected to the intermediate shaft. In the third gear-set, first member is connected to the intermediate shaft and to the third input member, second and third members are set coaxially relative to the intermediate shaft and configured for asynchronous rotation with each other, and the third member is also connected to the output member.

20 Claims, 4 Drawing Sheets

US 9,017,203 B2

COAXIAL GEAR SYSTEM

CROSS-REFERENCE TO RELATED APPLICATIONS

This application claims the benefit of U.S. Provisional Patent Application No. 61/708,872 filed on Oct. 2, 2012, which is hereby incorporated by reference in its entirety.

TECHNICAL FIELD

The disclosure relates to a coaxial gear system for transferring multiple torque inputs.

BACKGROUND

Gear systems or gear-trains are generally used to transfer rotation and torque between physically separate locations. A gear-train may also permit mechanical advantage to be gained between the input to the gear-train and its output. Gear-trains are typically formed by mounting two or more gears on a frame in a way to permit teeth of the subject gears to engage. For example, gear-trains are frequently employed for transmitting torque from one or more powerplants to power a vehicle.

In order to provide a smooth transmission of rotation in a gear-train from one gear to the next, gear teeth are designed to ensure that the pitch circles of engaging gears roll on each other without slipping. The ratio of the pitch circles of mating gears defines the speed ratio and the mechanical advantage of a specific gear-set. A gear-train may utilize epicyclic or planetary gearing. A gear-train with planetary gearing is capable of providing high gear reduction, i.e., ratio between the input and output, and mechanical advantage in a compact package.

SUMMARY

A gear-train for transferring torque from multiple power sources includes a first input member, a second input member, and a third input member. The first and second input members are configured to rotate about a first axis and the third input member is configured to rotate about a second axis. The gear-train also includes an output member configured to rotate about a third axis. The gear-train additionally includes a first gear-set operatively connected to the first input member, wherein the first gear-set includes first, second, and third members. The gear-train also includes a second gear-set operatively connected to the second input member, wherein the second gear-set includes first, second, and third members. The gear-train additionally includes an intermediate shaft configured to rotate about a fourth axis. Furthermore, the gear-train includes a third gear-set operatively connected to the intermediate shaft, wherein the third gear-set includes first, second, and third members. The first member of the third gear-set is continuously connected to the intermediate shaft, and the second and third members of the third gear-set are set coaxially with respect to the intermediate shaft, i.e., about the fourth axis, and configured for asynchronous rotation with each other. The first member of the third gear-set is connected to the third input member and the third member of the third gear-set is connected to the output member.

The first member of the first gear-set may be continuously connected to the first input member.

The first member of the second gear-set may be directly connected to the second member of the first gear-set. The second member of the second gear-set may be directly connected to the third member of the first gear-set. The third member of the second gear-set may be connected to the first member of the third gear-set. Additionally, the third member of the first gear-set may be connected to the second member of the third gear-set.

The first member of the second gear-set may be directly connected to the second member of the first gear-set. The second member of the second gear-set may be directly connected to the third member of the second gear-set. The third member of the second gear-set may be connected to the first member of the third gear-set. Additionally, the third member of the first gear-set may be connected to the second member of the third gear-set.

The first gear-set may be a planetary type. Accordingly, the first member of the first gear-set may be a sun gear, the second member of the first gear-set may be a carrier member, and the third member of the first gear-set may be a ring gear.

Like the first gear-set, the second gear-set may be a planetary type. Accordingly, the first member of the second gear-set may be a sun gear, the second member of the second gear-set may be a carrier member, and the third member of the second gear-set may be a ring gear.

The second and third members of the third gear-set may be fixed to an outer shaft arranged for rotation relative to intermediate shaft. Furthermore, the outer shaft may be supported with respect to the intermediate shaft via at least one bearing.

The gear-train may be encased in a housing. In such a case, each of the first input member, the second input member, the intermediate shaft, and the output member may be a respective shaft that is supported relative to the housing via at least one deep groove ball bearing and at least one roller bearing. The at least one deep groove bearing may be fixed both radially and axially with respect to the shaft and at least one roller bearing may be fixed radially but free axially with respect to the shaft.

The gear-train may further include a trapped snap-ring configured to retain the at least one deep-groove ball bearing with respect to the respective shaft.

The output shaft may also be supported with respect to the housing via at least one roller bearing and at least one thrust bearing.

The above-disclosed gear-train in conjunction with an engine, a first motor/generator, and a second motor/generator may be part of a hybrid powertrain used for launching and propelling a vehicle.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
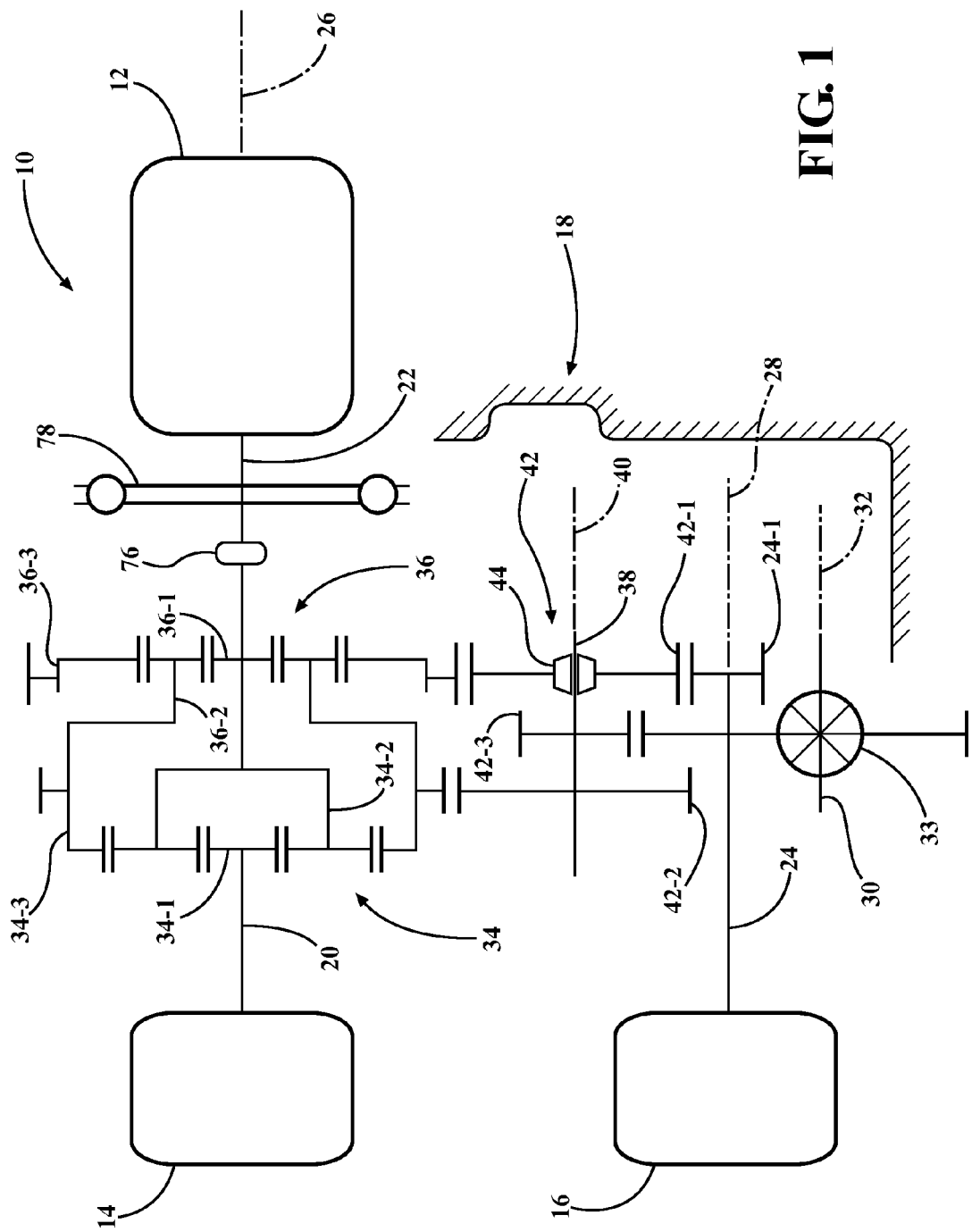
FIG. 1 is a schematic stick diagram illustration of a gear-train employed as part of a hybrid powertrain for a vehicle.

Referring to the drawings, wherein like reference numbers refer to like components, FIG. 1 illustrates a hybrid powertrain 10 configured to launch and propel a vehicle, i.e., to operate the vehicle in all speed ranges between low and high road speeds. The hybrid powertrain 10 includes multiple power sources, which include an internal combustion engine 12, a first electric motor/generator 14, and a second electric motor/generator 16, all connected to a gear-train 18 that operates as a compound-split "electrically variable transmission" (EVT). Although the hybrid powertrain 10 as shown includes the engine 12 and the motor/generators 14, 16, the powertrain may include solely electric motor/generators.

The powertrain 10 additionally has an energy storage system that includes one or more batteries that are not specifically shown, but known by those skilled in the art. The energy storage system is operatively connected to the first and second motor/generators 14, 16 such that the motor/generators may transfer torque to or receive torque from the engine 12. Although not shown, the powertrain 10 also includes a controller or an electronic control unit (ECU). The controller is operatively connected to the power sources and to the energy storage system to control the distribution of torque from the power sources to the gear-train 18.

As shown, the gear-train 18 is operatively connected to each of the engine 12, the first motor/generator 14, and the second motor/generator 16. Channeling respective torques of the engine 12 and the two motor/generators 14 and 16 to different members of the planetary gear-train permits one of the power sources to either assist or balance the operation of any of the other two. Thus, the combination of one engine 12 and two motor/generators 14 and 16 operatively connected via the gear-train 18 allows speeds and torques of the engine and motor/generators to be controlled and selected independently in order to power a subject vehicle more efficiently. The configuration of the gear-train 18, to be described in greater detail below, may permit an overall decrease in torque requirement from the combination of the first and the second motor/generators 14 and 16, with or without employing torque input of the engine 12, while affording specifically required vehicle performance.

The gear-train 18 includes a first input member 20 connected to the first motor/generator 14, a second input member 22 connected to the engine 12, and a third input member 24 connected to the second motor/generator 16. The input members 20, 22, 24 may be configured as shafts having splines or other appropriate interfaces for connecting with the first motor/generator 14, the engine 12, and the second motor/generator 16, respectively. The first and second input members 20, 22 are configured to rotate about a first axis 26, while the third input member 24 is configured to rotate about a second axis 28. The gear-train 18 also includes an output member 30 configured to rotate about a third axis 32. The output member 30 may be configured as a shaft having an appropriate interface for connecting with a final drive gear-set 33.

The gear-train 18 also includes a first gear-set 34 is operatively connected to the first input member 20 and a second gear-set 36 is operatively connected to the second input member 22. The first and second gear-sets 34, 36 may be planetary type, each having first, second, and third members. Accordingly, as shown, the first gear-set 34 may include a first member shown as sun gear 34-1, a second member shown as planetary carrier 34-2 having a plurality of pinion gears, and a third member shown as ring gear 34-3. As additionally shown, the second gear-set 36 may include a first member shown as sun gear 36-1, a second member shown as planetary carrier 36-2, and a third member shown as ring gear 36-3. The first gear-set 34 is interconnected with the second planetary gear-set 36, wherein two members of the first gear-set are operatively connected to two members of the second gear-set. As shown, the sun gear 34-1 may be continuously connected to the first input member 20, while the sun gear 36-1 may be operatively connected to the second input member 22.

The gear-train 18 also includes an intermediate or inner shaft 38 configured to rotate about a fourth axis 40. A third gear-set 42 is set coaxially for rotation with respect to the intermediate shaft 38 and about the axis 40. The third gear-set 42 includes a first member 42-1, a second member 42-2, and third member 42-3. The first member 42-1 is continuously connected to an outer shaft 44, and may thus be splined and/or pinned to the outer shaft. The second member 42-2 and third member 42-3 are continuously connected or fixed to the intermediate shaft 38. Accordingly, the second and third members 42-2, 42-3 may each be splined and/or pinned to the intermediate shaft 38. The second member 42-2 and third member 42-3 are generally configured to rotate in the same direction with respect to the first member 42-1 about the fourth axis 40, but at dissimilar rates, i.e., the rotation of the second and third members with respect to the first member 42-1 is asynchronous. Accordingly, the second member 42-2 and third member 42-3 may be secured to one another via any appropriate methods, such as directly by welding or fastening or indirectly by each being pressed or pinned to the intermediate shaft 38.

The first member 42-1 is directly connected to the third input member 24 via a drive gear 24-1. The third member 42-3 is directly connected to the output member 30 via the final drive gear-set 33. The gear-train 18 is encased in a housing 46 (shown in FIG. 3) that retains lubricants, supports the internal components, i.e., shafts and gear-sets described above, and keeps contamination and external elements away from the gear-train. Furthermore, the slower of the rotating intermediate shaft 38 and outer shaft 44 may be connected to the housing 46 via bearings, while the faster of the two shafts may ride on bearings solely with respect to the slower shaft, without any connection to the housing. Such a construction would tend to minimize friction losses, because the rotating speed of the shaft 38 or 44 that is supported directly by the housing 46 may be kept to a minimum. Additionally, the difference in bearing speeds between the faster and slower shafts will also be minimized.

Figure 2:
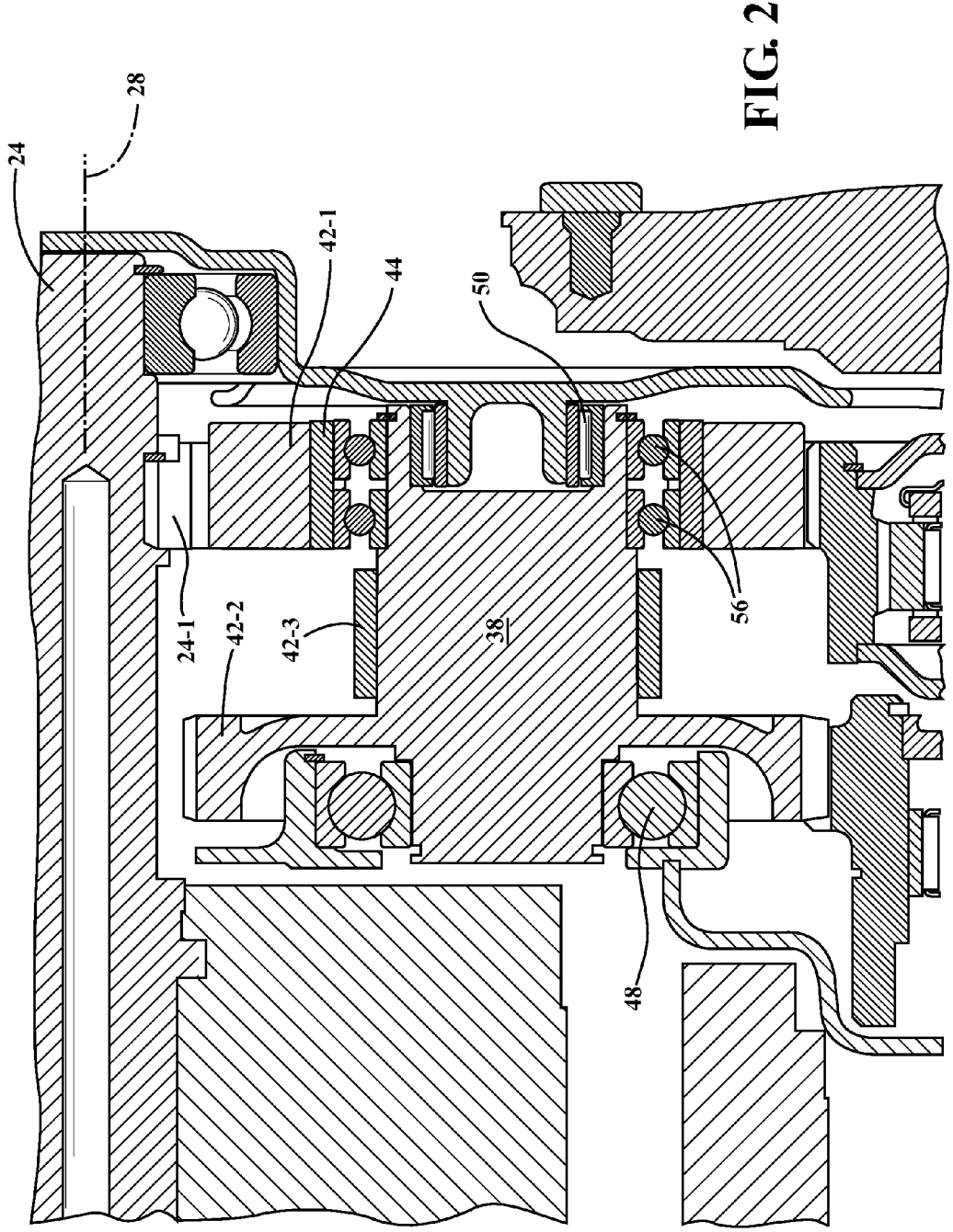
FIG. 2 is a cross-section of an embodiment of the gear-train shown in FIG. 1.

As shown in FIG. 1, the sun gear 36-1 may be directly and continuously connected to the planetary carrier 34-2. The planetary carrier 36-2 may be directly and continuously connected to the ring gear 34-3. The ring gear 36-3 may be in mesh with the first member 42-1. Additionally, the ring gear 34-3 may be in mesh with the second member 42-2. As shown in FIG. 2, the second member 42-2 and the third member 42-3 of the third gear-set may each be mounted on the inner shaft 38, while the first member 42-1 is mounted on the outer shaft 44. The outer shaft 44 may then be supported with respect to the intermediate shaft 38 via bearings 56. Each of the bearings 56 may be configured as radial deep-groove ball type for supporting axial loads that maybe encountered by the bearings during transfer of input torque from the power sources 12, 14, and 16 by the gear-train 18. In deep-groove radial bearings, dimensions of the bearing's inner and outer races are close to the dimensions of the balls that run in the subject races, thus permitting deep-groove bearings to support a measure of axial load.

Figure 3:
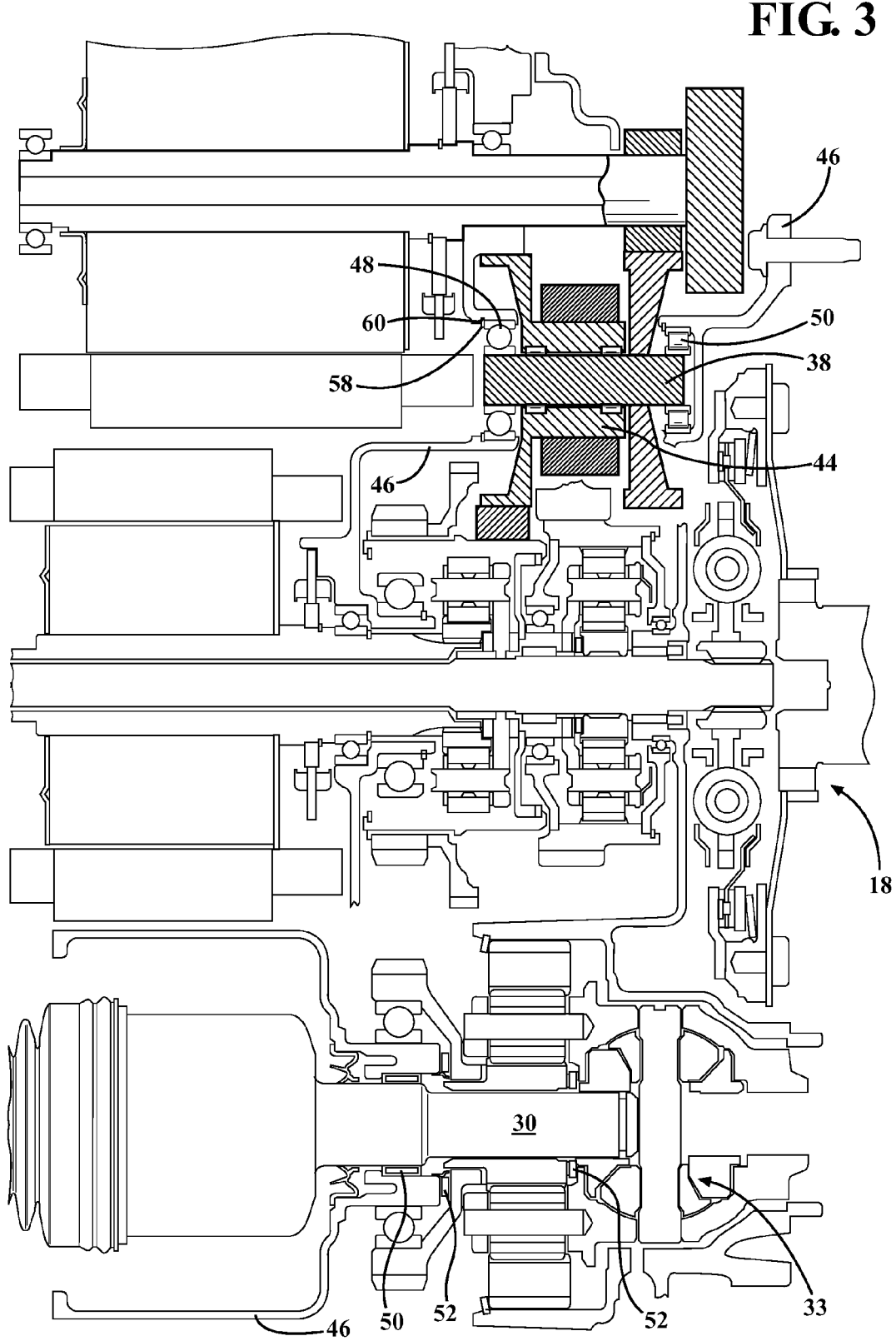
FIG. 3 is a cross-section of another embodiment of the gear-train shown in FIG. 1.

As shown in FIG. 3, wherein the output member 30 is configured as a shaft, the output member may be supported with respect to the housing 46 via at least one roller bearing 50 and at least one thrust bearing 52. Alternatively, the output member 30 may be supported with respect to the housing 46 via a plurality of deep-groove bearings, similar to bearings 48. Each of the described combination of roller bearing 50 and thrust bearing 52 and the alternative plurality of deep-groove bearings is advantageous in permitting the support of the output member 30 to withstand both radial and axial forces during operation of the gear-train 18. As shown, the output member 30 may also have an appropriate interface 54 for connecting with a final drive gear-set 33.

Furthermore, each of the first input member 20, the second input member 22, the intermediate shaft 38, and the output member 30 may be supported with respect to the housing 46 via at least one deep-groove ball bearing similar to bearings 48 that provides both radial and axial support to the respective member/shaft and at least one roller bearing 50 or one or more ball bearings 56 that provide radial support to the subject member/shaft but permit axial freedom of movement. Accordingly, the above system having a bearing that supports both axial and radial loads and one or more bearings that are designed to only support significant radial loads permits increased axial span to be employed between the subject bearings. The gear-train 18 may include trapped snap-rings 58 to retain, i.e., maintain position of, the deep-groove ball bearings that are used to support any of the first input member 20, the second input member 22, the output member 30, the intermediate shaft 38, and the outer shaft 44 (shown in FIG. 3). The snap-ring 58 is configured to retain the deep-groove ball bearing axially, i.e., restrain axial motion with respect to the respective member/shaft or housing 46. The snap-ring 58 may be installed into the gear-train 18 by being loaded into a specifically configured feature, such as a circumferential channel or groove 60 on the respective member/shaft, the housing 46, or on the outer race of the particular deep-groove ball bearing.

Employing the above-described connection between its members, the gear-train 18 may permit a wide-node gear ratio spread, which is depicted by the graph in FIG. 4 and will be described in greater detail below. As employed herein, the concept of "node width" represents the distance traveled by the vehicle per each revolution of the engine 12, and the term "wide-node" is indicative of the distance traveled by a vehicle employing the gear-train 18 operatively connecting each of the engine 12, the first motor/generator 14, and the second motor/generator 16 as compared to another arrangement in a vehicle employing a typical single-mode compound-split EVT.

Figure 4:
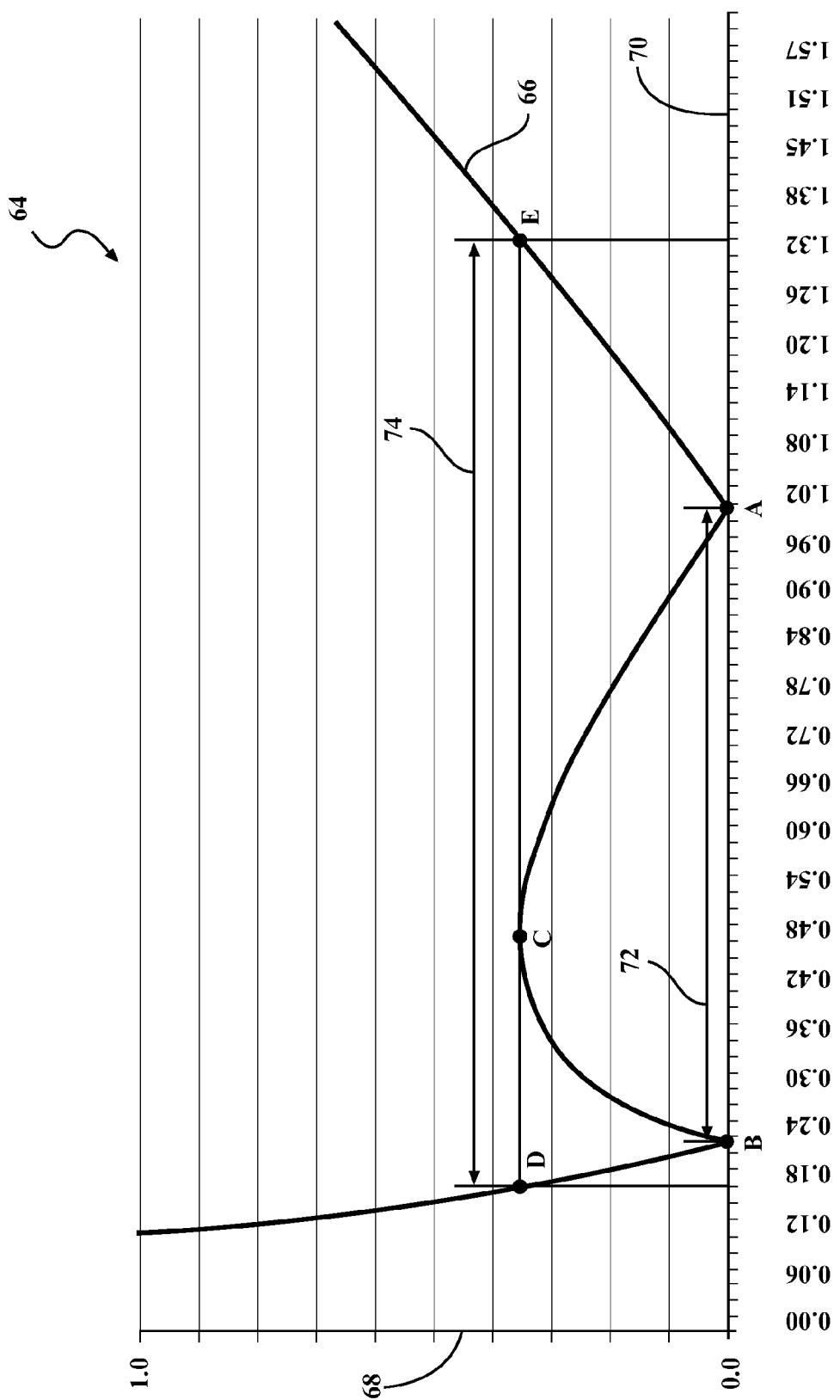
FIG. 4 is a graph illustrating a comparison of vehicle distance traveled per engine revolution for the wide-node EVTs shown in FIGS. 1-3.

FIG. 4 shows a graph 64 of electrical power path magnitude as a fraction of engine torque used to drive the vehicle versus the vehicle distance traveled per engine revolution in meters traced by a curve 66. The electrical power path magnitude is shown on the Y-axis of the graph 64 and is represented by numeral 68, while the vehicle distance traveled per engine revolution is shown on the X-axis of the graph and is represented by numeral 70. Additionally, the graph 64 compares node widths of exemplary embodiment of the gear-train 18 which is represented by a distance 72 between mechanical points or nodes identified by letters A and B and a distance 74 between points identified by letters D and E plotted on the curve 66. In a specific example, the distance 72 traveled by the vehicle per each revolution of the engine 12 with the gear-train 18, when electric power path (from the first and second motor/generators 14, 16) is zero, exceeds approximately 0.8 meters. As shown, for the same configuration, the distance 72 traveled by the vehicle per each revolution of the engine 12 when electric power from the first and second motor/generators 14, 16 is approximately equal to a fraction of engine power identified by letter C and exceeds 1.2 meters. By comparison, in a typical single-mode compound-split EVT the distance 72 is generally around 0.5 meters, while also having the distance 74 of under of 1.2 meters. Accordingly, the greater distance 72 for the gear-train 18 than for a typical representative single-mode compound-split EVT identifies the gear-train 18 as having a wider-node gear ratio spread.

As a result, the gear-train 18 is capable of providing at least a 3 to 1 gear ratio spread between the torque-transmitting the input member 20 and the output member 30. Furthermore, the highest numerical gear ratio of the gear-train 18 may have approximately 4 to 1 as its highest numerical gear ratio and approximately 0.7 to 1 as its lowest numerical gear ratio. As a result, the first motor/generator 14 may be sized differently, i.e., be physically smaller, than the second motor/generator 16. Accordingly, the first motor/generator 14 may be configured to generate less torque than the second motor/generator 16. Additionally, each of the first and second motor/generators 14, 16 may be configured with solid cores and employ non-rare earth magnets which are significantly more ubiquitous and less expensive than rare earth type.

With resumed reference to FIG. 1, the hybrid powertrain 10 also includes a hydraulic pump 76. The hydraulic pump 76 is configured to supply pressurized fluid to lubricate the gear-train 18, as well as the engine 12 and the first and second motor/generators 14, 16. As shown, the pump 76 is operatively connected to the second input member 22. The hybrid powertrain 10 also includes a damper 78. The damper 78 is operatively connected to the engine 12 and is configured to absorb torsional vibrations generated by the engine before such vibrations may be transmitted to the gear-train 18 via the second input member 22.

The gear-train 18 is a cost effective single-mode compound-split electro-mechanical drive unit which embodies advantages of a two-mode system that provides a first mode for launching a vehicle from rest and a separate second mode for propelling the subject vehicle at higher speeds, but eschews the two-mode system's mechanical and controls complexity. Additionally, the gear-train 18 employs continuously meshed gears for transferring torque from the engine 12 and the motor/generators 14, 16 without resorting to a belt or chain drive. Moreover, because the gear-train 18 is an off-axis layout, i.e., has the engine 12 and the motor/generator 14 disposed on the first rotating axis 26 while the motor/generator 16 is disposed on the second rotating axis 28, the gear-train 18 is particularly suitable to front-wheel-drive vehicle applications, where the powertrain 10 is situated substantially transversely with respect to longitudinal axis of the subject vehicle.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A gear-train for transferring torque from multiple power sources, the gear system comprising:
   a first input member, a second input member, and a third input member, wherein the first and second input members are configured to rotate about a first axis and the third input member is configured to rotate about a second axis;
   an output member configured to rotate about a third axis;
   a first gear-set operatively connected to the first input member, the first gear-set including first, second, and third members;

a second gear-set operatively connected to the second input member, the second gear-set including first, second, and third members;
an intermediate shaft configured to rotate about a fourth axis; and
a third gear-set operatively connected to the intermediate shaft, the third gear-set including first, second, and third members;
wherein:
  each of the first and second gear-sets is a planetary gear-set;
  the first member of the third gear-set is continuously connected to the intermediate shaft, the second and third members of the third gear-set are set coaxially with respect to the intermediate shaft and configured for asynchronous rotation with each other;
  the first member of the third gear-set is connected to the third input member; and
  the third member of the third gear-set is connected to the output member.

2. The gear-train according to claim 1, wherein the first member of the first gear-set is continuously connected to the first input member.

3. The gear-train according to claim 1, wherein the first member of the second gear-set is operatively connected to the second input member.

4. The gear-train according to claim 1, wherein:
the first member of the second gear-set is directly connected to the second member of the first gear-set;
the second member of the second gear-set is directly connected to the third member of the first gear-set;
the third member of the second gear-set is connected to the first member of the third gear-set; and
the third member of the first gear-set is connected to the second member of the third gear-set.

5. The gear-train according to claim 1, wherein:
the first member of the first gear-set is a sun gear, the second member of the first gear-set is a carrier member, the third member of the first gear-set is a ring gear; and
the first member of the second gear-set is a sun gear, the second member of the second gear-set is a carrier member, the third member of the second gear-set is a ring gear.

6. The gear-train according to claim 1, wherein the second and third members of the third gear-set are fixed to an outer shaft arranged for rotation relative to intermediate shaft, and wherein the outer shaft is supported with respect to the intermediate shaft via at least one bearing.

7. The gear-train according to claim 6, wherein the at least one bearing is a deep-groove ball bearing.

8. The gear-train according to claim 1, wherein the gear-train is encased in a housing, each of the first input member, the second input member, the intermediate shaft, and the output member is a respective shaft, and at least one of the respective shafts is supported with respect to the housing via at least one deep-groove ball bearing and at least one roller bearing.

9. The gear-train according to claim 8, further comprising a trapped snap-ring configured to retain the at least one deep-groove ball bearing with respect to the respective shaft.

10. The gear-train according to claim 1, wherein the gear-train is encased in a housing and the output member is a shaft that is supported with respect to the housing via at least one roller bearing and at least one thrust bearing.

11. A hybrid powertrain for launching and propelling a vehicle, comprising:
a first motor/generator;
a second motor/generator;
an engine; and
a gear-train for transferring torque from the first motor/generator; the second motor/generator, and the engine to power the vehicle, the gear-train having:
  a first input member connected to the first motor/generator, a second input member connected to the engine, and a third input member connected to the second motor/generator, wherein the first and second input members are configured to rotate about a first axis and the third input member is configured to rotate about a second axis;
  an output member configured to rotate about a third axis;
  a first gear-set operatively connected to the first input member, the first gear-set including first, second, and third members;
  a second gear-set operatively connected to the second input member, the second gear-set including first, second, and third members;
  an intermediate shaft configured to rotate about a fourth axis; and
  a third gear-set operatively connected to the intermediate shaft, the third gear-set including first, second, and third members;
  wherein:
    each of the first and second gear-sets is a planetary gear-set;
    the first member of the third gear-set is continuously connected to the intermediate shaft, the second and third members of the third gear-set are set coaxially with respect to the intermediate shaft and configured for asynchronous rotation with each other;
    the first member of the third gear-set is connected to the third input member; and
    the third member of the third gear-set is connected to the output member.

12. The hybrid powertrain according to claim 11, wherein the first member of the first gear-set is continuously connected to the first input member.

13. The hybrid powertrain according to claim 11, wherein the first member of the second gear-set is operatively connected to the second input member.

14. The hybrid powertrain according to claim 11, wherein:
the first member of the second gear-set is directly connected to the second member of the first gear-set;
the second member of the second gear-set is directly connected to the third member of the first gear-set;
the third member of the second gear-set is connected to the first member of the third gear-set; and
the third member of the first gear-set is connected to the second member of the third gear-set.

15. The hybrid powertrain according to claim 11, wherein:
the first member of the first gear-set is a sun gear, the second member of the first gear-set is a carrier member, the third member of the first gear-set is a ring gear; and
the first member of the second gear-set is a sun gear, the second member of the second gear-set is a carrier member, the third member of the second gear-set is a ring gear.

16. The hybrid powertrain according to claim 11, wherein the second and third members of the third gear-set are fixed to an outer shaft arranged for rotation relative to intermediate shaft, and wherein the outer shaft is supported with respect to the intermediate shaft via at least one bearing.

17. The hybrid powertrain according to claim 16, wherein the at least one bearing is a deep-groove ball bearing.

18. The hybrid powertrain according to claim 11, wherein the gear-train is encased in a housing, each of the first input member, the second input member, the intermediate shaft, and the output member is a respective shaft, and at least one of the respective shafts is supported with respect to the housing via at least one deep-groove ball bearing and at least one roller bearing.

19. The hybrid powertrain according to claim 18, further comprising a trapped snap-ring configured to retain the at least one deep-groove ball bearing with respect to the respective shaft.

20. The hybrid powertrain according to claim 11, wherein the gear-train is encased in a housing and the output member is a shaft that is supported with respect to the housing via at least one roller bearing and at least one thrust bearing.

* * * * *